United States Patent
Chifor et al.

(10) Patent No.: US 11,652,842 B2
(45) Date of Patent: May 16, 2023

(54) EDGE DEVICE ASSISTED MITIGATION OF PUBLISH-SUBSCRIBE DENIAL OF SERVICE (DOS) ATTACKS

(71) Applicant: LENOVO ENTERPRISE SOLUTIONS (SINGAPORE) PTE. LTD., Singapore (SG)

(72) Inventors: Bogdan-Cosmin Chifor, Bucharest (RO); George-Andrei Stanescu, Ilfov (RO); Radu Mihai Iorga, Bucharest (RO); Corneliu-Ilie Calciu, Bucharest (RO)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 154 days.

(21) Appl. No.: 16/915,536

(22) Filed: Jun. 29, 2020

(65) Prior Publication Data
US 2021/0409444 A1 Dec. 30, 2021

(51) Int. Cl.
*H04L 9/40* (2022.01)
*H04L 67/55* (2022.01)

(52) U.S. Cl.
CPC ...... *H04L 63/1458* (2013.01); *H04L 63/0227* (2013.01); *H04L 63/08* (2013.01); *H04L 63/205* (2013.01); *H04L 67/55* (2022.05)

(58) Field of Classification Search
CPC . H04L 63/1458; H04L 63/0227; H04L 63/08; H04L 63/205; H04L 67/26
See application file for complete search history.

(56) References Cited

U.S. PATENT DOCUMENTS

| | | | | |
|---|---|---|---|---|
| 2002/0184528 A1* | 12/2002 | Shevenell | ........... | H04L 63/1416 726/6 |
| 2017/0195345 A1* | 7/2017 | Maresca | ............. | H04L 63/1416 |
| 2017/0223037 A1* | 8/2017 | Singh | .................. | H04L 63/1441 |
| 2019/0081980 A1* | 3/2019 | Luo | .......................... | G06F 21/53 |
| 2019/0222590 A1* | 7/2019 | Mady | ..................... | H04L 63/20 |
| 2019/0306267 A1* | 10/2019 | Lee | ..................... | H04L 63/0428 |
| 2019/0327320 A1* | 10/2019 | Rubin | ..................... | H04L 67/26 |
| 2020/0021586 A1* | 1/2020 | Schmidt | ............. | H04L 63/0884 |

(Continued)

OTHER PUBLICATIONS

Bhardwaj et al., Towards IoT-DDoS Prevention Using Edge Computing, https://eskang.github.io/papers/safethings17.pdf, HotEdge, 2018, 7 pages.

(Continued)

*Primary Examiner* — Chris Parry
*Assistant Examiner* — Steven C Nguyen

(57) ABSTRACT

Methods, apparatuses, and computer program products for edge device assisted mitigation of publish-subscribe denial of service (DoS) attacks are disclosed. An edge device hosts a virtualized copy of an Internet-of-Things (IoT) device subscribed to one or more publish-subscribe topics. When the edge device receives an indication to activate the virtualized copy of the IoT device, for example, during a DoS attack on the IoT device, the edge device activates the virtualized copy of the IoT device, which receives traffic from the publish-subscribe topic. The virtualized copy of the IoT device applies security policies to incoming traffic received from the subscription topics and transmits to the IoT device sanitized traffic obtained from the received incoming subscription content traffic.

17 Claims, 10 Drawing Sheets

(56) References Cited

U.S. PATENT DOCUMENTS

| | | | |
|---|---|---|---|
| 2021/0029156 A1* | 1/2021 | Sharifi Mehr | H04L 63/1433 |
| 2021/0051177 A1* | 2/2021 | White | H04L 67/56 |
| 2021/0185042 A1* | 6/2021 | Sharma | G06F 21/602 |
| 2021/0328880 A1* | 10/2021 | Kim | H04L 41/145 |
| 2022/0141253 A1* | 5/2022 | Xiao | H04L 63/0281 |
| | | | 726/22 |

OTHER PUBLICATIONS

Kim et al., An Architectural Mechanism for Resilient IoT Services, SafeThings'17, Nov. 5, 2017, Delft, The Netherlands, Association for Computing Machinery, ACM ISBN 978-1-4503-5545-Feb. 17, 2011, https://eskang.github.io/papers/salethings17.pdf, 6 pages.

Morabito et al., Consolidate IoT Edge Computing with Lightweight Virtualization, IEEE Network, vol. 32, Issue: 1, Jan. 26, 2018, DOI: 10.1109/MNET.2018.1700175, http://home.in.tum.de/~ding/files/netmag-pre-camera.pdf, pp. 102-111.

Sairam et al., NETRA: Enhancing IoT Security using NFV-based Edge Traffic Analysis, IEEE Sensors Journal, vol. 19, Issue 12, Jun. 2019, pp. 4660-4671, DOI:10.1109/JSEN.2019.2900097, https://arxiv.org/pdf/1805.10815.pdf.

\* cited by examiner

EDGE DEVICE ASSISTED MITIGATION OF PUBLISH-SUBSCRIBE DENIAL OF SERVICE (DOS) ATTACKS

BACKGROUND

Field of the Invention

The field of the invention is data processing, or, more specifically, methods, apparatus, and products for edge device assisted mitigation of publish-subscribe denial of service (DoS) attacks.

Description of Related Art

The Internet-of-Things (IoT) generally refers to a system of devices that communicate over a network without human-device interaction. IoT devices are often resource-constrained devices such as, sensors, "smart home" devices, appliances, portable devices, embedded systems, and the like that are limited in their resources, such as computational resources, memory, communication bandwidth, or battery power. While IoT devices may operate within a local network, that local network is typically connected to the Internet or other external network. The connection to such an external network means the IoT devices on the local network are susceptible to attacks, such as denial of service (DoS) attacks, from malicious entities. Moreover, limited resources on the IoT device make it particularly susceptible to attack.

IoT networks are susceptible to a diverse range of DoS attacks, ranging from a classic packet flood scenario to intensive protocol uses which can hamper computational resources, consume memory or bandwidth, and drain the device's battery. Often DoS attacks on IoT networks include application specific attacks target specific vulnerabilities of the IoT network, for example, by taking into consideration the heterogeneity of the network (devices with different hardware capabilities and software stacks). Many of the IoT DoS attacks are carried out in the context of publish-subscribe protocols, which are commonly used in IoT networks. Because of the limited resources of the IoT device, packet traffic filtering and firewall security policies on the are difficult if not impossible to implement on the IoT device.

SUMMARY

An embodiment in accordance with the present invention is directed to a method of edge device assisted mitigation of publish-subscribe denial of service (DoS) attacks, the method comprising hosting, on an edge device, a virtualized copy of an Internet-of-Things (IoT) device, receiving, from the IoT device, an indication to activate the virtualized copy of the IoT device, activating, by the edge device, the virtualized copy of the IoT device, applying, by the virtualized copy of the IoT device, security policies to incoming traffic received from the one or more subscription topics, and transmitting, by the virtualized copy of the IoT device to the IoT device, sanitized traffic obtained from the received incoming traffic.

Another embodiment in accordance with the present invention is directed to an apparatus for edge device assisted mitigation of publish-subscribe DoS attacks, the apparatus comprising a computer processor, a computer memory operatively coupled to the computer processor, the computer memory having disposed within it computer program instructions that, when executed by the computer processor, cause the apparatus to host, on an edge device, a virtualized copy of an IoT device, receive, from the IoT device, an indication to activate the virtualized copy of the IoT device, activate, by the edge device, the virtualized copy of the IoT device, apply, by the virtualized copy of the IoT device, security policies to incoming traffic received from the one or more subscription topics, and transmit, by the virtualized copy of the IoT device to the IoT device, sanitized traffic obtained from the received incoming traffic.

Yet another embodiment in accordance with the present invention is directed to a computer program product for edge device assisted mitigation of publish-subscribe DoS attacks, the computer program product disposed upon a computer readable medium, the computer program product comprising computer program instructions that, when executed, cause a computer to host, on an edge device, a virtualized copy of an IoT device receive, from the IoT device, an indication to activate the virtualized copy of the IoT device, activate, by the edge device, the virtualized copy of the IoT device, apply, by the virtualized copy of the IoT device, security policies to incoming traffic received from the one or more subscription topics, and transmit, by the virtualized copy of the IoT device to the IoT device, sanitized traffic obtained from the received incoming traffic.

In various embodiments in accordance with the present invention hosting, on the edge device, the virtualized copy of an IoT device may include hosting a copy of a software stack of the IoT device. Receiving, from the IoT device, the indication to activate the virtualized copy of the IoT device may include receiving a report of a denial of service attack on the IoT device. Activating, by the edge device, the virtualized copy of the IoT device may include subscribing, by the virtualized copy of the IoT device, to one or more topics subscribed to by the IoT device. Applying, by the virtualized copy of the IoT device, the security policies to incoming traffic received from the one or more subscription topics may include identifying an application-specific threat in the incoming traffic and implementing an application-specific security policy that mitigates the identified threat.

Various embodiments in accordance with the present invention may further comprise providing a discoverable service for application-specific traffic filtering to the IoT device, authenticating the edge device to the IoT device, installing the virtualized copy of the IoT device, and establishing a cryptographic communication channel with the IoT device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
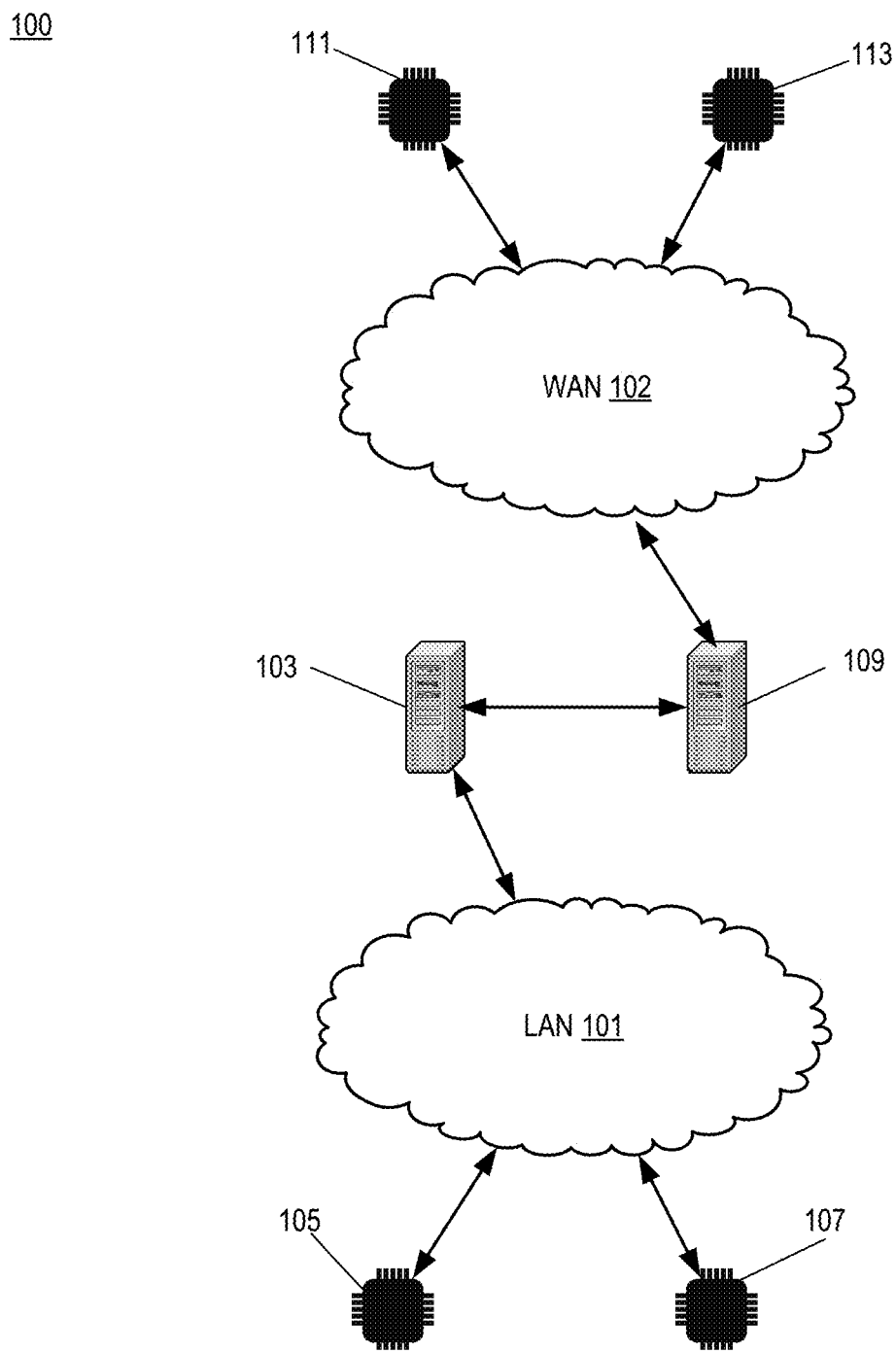
FIG. 1 is a network diagram illustrating a publish-subscribe network for IoT devices that is configurable in accordance with the present invention.

Exemplary methods, apparatus, and products for edge device assisted mitigation of publish-subscribe DoS attacks in accordance with the present invention are described with reference to the accompanying drawings, beginning with FIG. 1. FIG. 1 sets forth a network diagram of a system configurable for edge device assisted mitigation of publish-subscribe DoS attacks according to embodiments of the present invention. The system (100) of FIG. 1 illustrates an information flow in publish-subscribe network, and includes an edge device (103) connected via a local area network (LAN) (101), such as an IoT network, to one or more Internet-of-Things (IoT) devices (105, 107). The edge device (103) may be, for example, an edge server, router, routing switch, integrated access device (IAD) or other device that acts as a gateway or entry point into a core local network, such as an IoT network. The IoT devices (105, 107) may be resource-constrained devices such as, sensors, "smart home" devices, appliances, portable devices, embedded systems, and the like that are limited in their resources, such as computational resources, memory, communication bandwidth, or battery power.

The system (100) of FIG. 1 also includes a publish-subscribe broker (109), which may be implemented on the edge device (103) or on another device connected to the edge device (103). In the publish-subscribe paradigm, providers (publishers) of information (publications) have no direct link to specific consumers of that information (subscribers). The publication may be categorized according to a logical channel of information (a "topic") and delivered to subscribers of the topic, or publications may be delivered to subscribers based on content, where the publication is delivered to the subscriber if the content of the publication matches constraints defined by the subscriber. The publish-subscribe broker (109) receives publications from publishers such as the publishers (111, 113) in FIG. 1 and determines which publications should be delivered to particular subscribers. The IoT devices (105, 107) may be subscribers and may register a request for a publication with the publish-subscribe broker (109) by specifying the topic (or topics) of the published messages that it is interested in. These subscriptions might include a subscription point from which it wants to receive publications, a content filter that should be applied to the published message, and the name of a subscriber queue on which publications that match the criteria selected are placed.

For example, in FIG. 1, both publishers (111, 113) are publishers of information to "TOPIC1" and the IoT devices (105, 107) are registered with the publish-subscribe broker (109) as subscribers to "TOPIC1." As such, the publishers (111, 113), which may also be IoT device, are producers of information, whereas the IoT devices (305, 307) are endpoint devices that consume the information from the publishers (111, 113). In the example scenario of FIG. 1, messages published to "TOPIC1" are received over the WAN (102) by the publish-subscribe broker (109) and routed to the edge device (103) for delivery to the IoT device (105, 107) in the LAN (101).

The arrangement of servers and other devices making up the exemplary system (100) illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

In the system (100) of FIG. 1, the publish-subscribe paradigm by which IoT devices (105, 107) receive information may be manipulated to effect a wide range of application specific DoS attacks. In particular, an untrusted publisher can inject malicious traffic in an IoT network with the purpose of draining the battery, hampering computational resources, or affecting the IoT service availability of an IoT device (105, 107). Untrusted publishers can be present in various IoT application scenarios, like ad-hoc connections or Vehicles-to-everything (V2X) systems.

Untrusted publishers can send traffic with a high rate (packet per second) or it can simply exploit an application specific vulnerability (e.g. transmit wrongly encoded/malicious data which cause resource allocation on the victim IoT device side).

In the particular case of publish-subscribe networks, this scenario becomes even more difficult because the publish-subscribe topic (which follows a multicast paradigm) is multiplexed by several traffic flows which can comprise both malicious and legitimate traffic (e.g., publisher (113) sends malicious traffic and publisher (111) sends legitimate traffic to the same topic). Moreover, the publisher authentication/authorization along with the network access is handled by the publish-subscribe broker (109) without the subscriber intervention, in contrast with a client-server paradigm.

One approach to overcoming these vulnerabilities is a centralized approach that implements traffic filtering/security policies on the publish-subscribe broker (109). This approach may use static firewall rules (e.g., traffic filtering by IP address, by port, or by a known application protocol field or header value). However, this approach does not address the dynamic character of IoT publish-subscribe networks, where a traffic flow may be classified as DoS by one IoT device and may be considered legitimate by another.

Another approach is to implement traffic filtering on the IoT device itself. While this approach has the advantage of applying an application specific security policy, the implementation of these security policies may overburden the resources of the IoT device, may be difficult to update, and may even be impossible to implement where the IoT device does not have the capacity to perform such filtering.

Edge device assisted mitigation of publish-subscribe DoS attacks according to embodiments of the present invention provides a virtualized shadow copy of the IoT device on a gateway device, such that the virtualized copy of the IoT device may utilize the processing power, memory, and other resources of the gateway device to carry out the application specific security policies of the IoT device. In particular edge device assisted mitigation of publish-subscribe DoS attacks offloads the traffic filtering/security process from the resource constrained IoT device and delegates it to the IoT device shadow copy, which is dynamically installed on the gateway device such as an edge server. Thus, in case of a DoS attack, the IoT shadow device on the gateway device absorbs the malicious traffic, filters it and delivers only the sanitized traffic to the protected IoT device.

Edge device assisted mitigation of publish-subscribe DoS attacks in accordance with the present invention is generally implemented with computers, that is, with automated computing machinery. In the system of FIG. 1, for example, all the edge device (103), IoT devices (105, 107), publish-subscribe broker (109), and publishers (111, 113) are implemented to some extent at least as computers. For further explanation, therefore, FIG. 2 sets forth a block diagram of automated computing machinery comprising an exemplary computer (152) configured for edge device assisted mitigation of publish-subscribe DoS attacks according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an IoT device application-specific platform (330), a module of computer program instructions that provides, as a service, a platform for hosting virtualized copies of IoT devices. Also stored in RAM (168) is a virtual IoT device (331), a module of computer program instructions for virtualizing a connected IoT device. Also stored in RAM (168) are application-specific security policies for the virtual IoT device (331). Also stored in RAM (168) is an operating system (154). Operating systems useful in computers configured for edge device assisted mitigation of publish-subscribe DoS attacks according to embodiments of the present invention include UNIX™, Linux™, Microsoft XP™, AIX™, IBM's i5/OS™, and others as will occur to those of skill in the art. The operating system (154), IoT device application-specific platform (330), virtual IoT device (331), application-specific security polices (333) in the example of FIG. 2 are shown in RAM (168), but many components of such software typically are stored in non-volatile memory also, such as, for example, on a disk drive (170).

Figure 2:
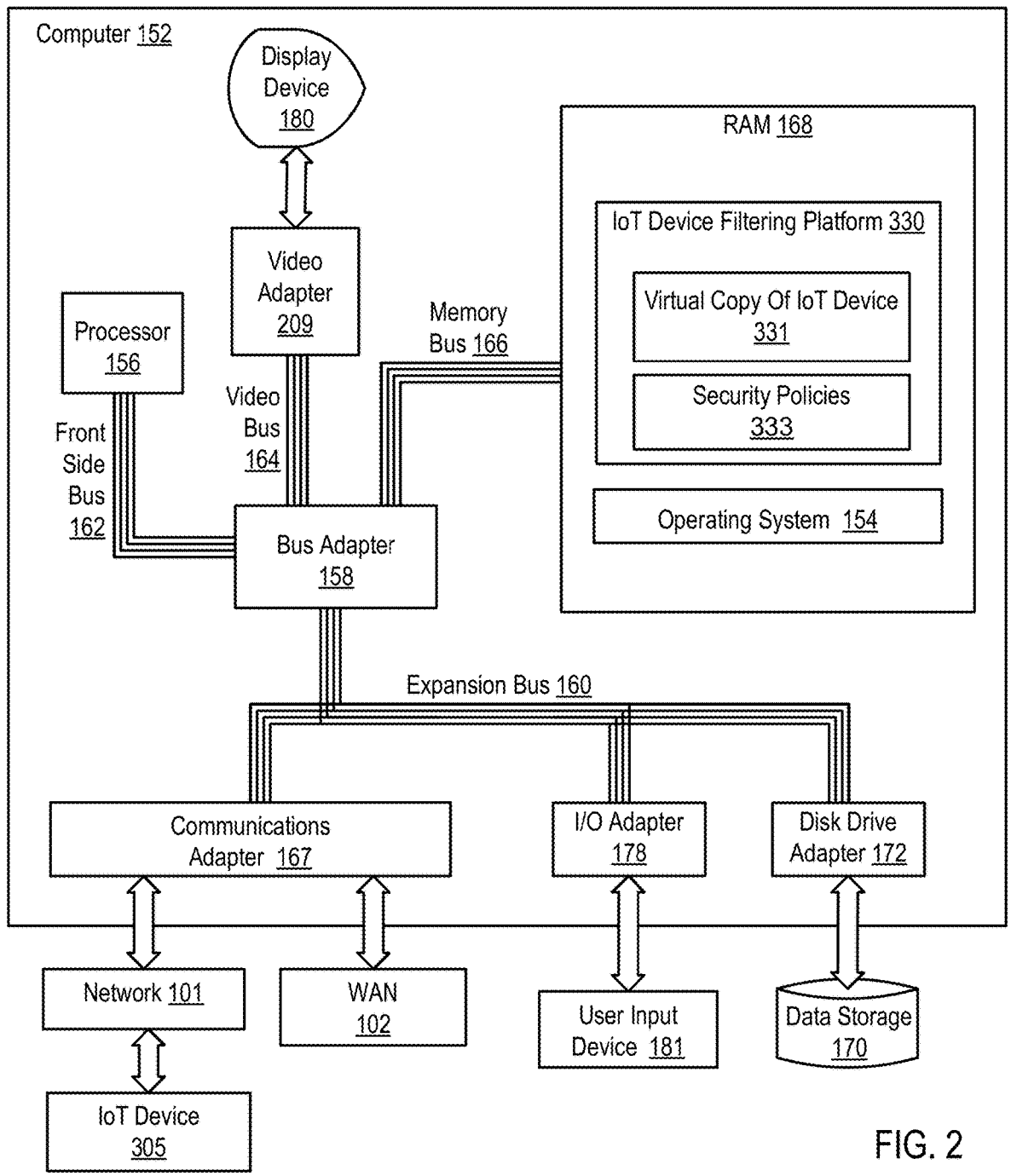
FIG. 2 is a diagram of an exemplary computer that is configurable in accordance with the present invention.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for edge device assisted mitigation of publish-subscribe DoS attacks according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (101). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for edge device assisted mitigation of publish-subscribe DoS attacks according to embodiments of the present invention include modems for wired dial-up communications, Ethernet (IEEE 802.3) adapters for wired data communications, and 802.11 adapters for wireless data communications.

Figure 3:
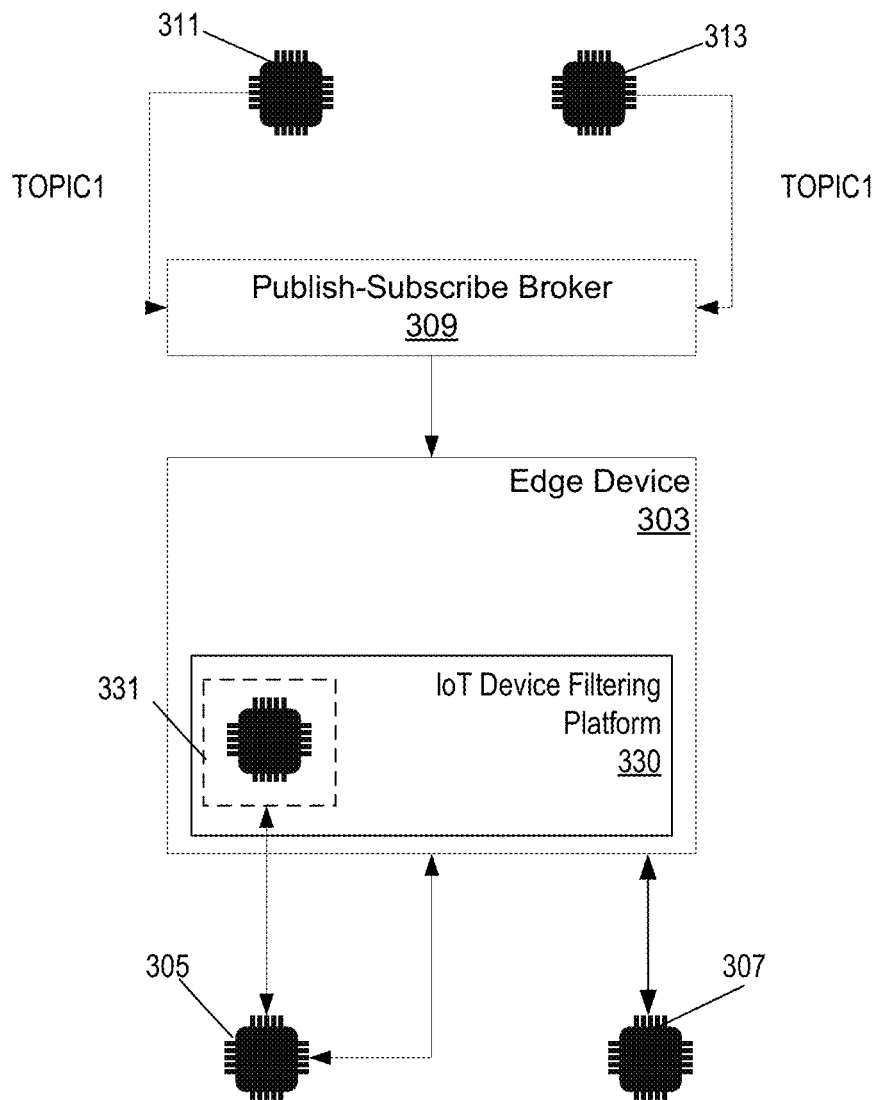
FIG. 3 is a diagram illustrating a system for edge device assisted mitigation of publish-subscribe DoS attacks in accordance with the present invention.

For further explanation, FIG. 3 sets forth a diagram illustrating an exemplary system for edge device assisted mitigation of publish-subscribe DoS attacks according to embodiments of the present invention. The system (300) includes an edge device (303), which may be similarly configured as exemplary computer (152), connected via a local area network (LAN) (101), such as an IoT network, to at least one IoT device (305), which may be similarly configured as devices (105, 107). The edge device (303) may be, for example, an edge server, router, routing switch, integrated access device (IAD) or other device that acts as a gateway or entry point into a core local network, such as an IoT network. The IoT device (305) may be resource-constrained devices such as, sensors, "smart home" devices, appliances, portable devices, embedded systems, and the like that are limited in their resources, such as computational resources, memory, communication bandwidth, or battery power.

The system (300) of FIG. 3 also includes the publish-subscribe broker (309), which may be similarly configured as the publish-subscribe broker (109) of FIG. 1, and which may be implemented on the edge device (303) or on another device connected to the edge device (303). The publish-subscribe broker (309) receives publications from publishers such as the publishers (311, 313) and determines which publications should be delivered to particular subscribers. In the example of FIG. 3, the publishers (311, 313) are both publishing messages to a topic "TOPIC1" and the IoT device (305) subscribes, via the publish-subscribe broker (309), to "TOPIC1." By way of example and not limitation, the publisher (311) may also be an IoT device such as a temperature sensor that publishes temperature readings for a room and TOPIC1 may be a topic concerning temperatures in that room. In this example, the publisher (313) may be a hijacked IoT device or malign entity that is publishing malicious traffic to TOPIC1 as part of a DoS attack, for example, by flooding TOPIC1 with message packets or by exploiting application specific vulnerabilities to drain the resources of the IoT device (305) and other devices in the IoT network subscribed to TOPIC1. While the IoT device (305) may not have the ability to determine whether incoming packets are part of a DoS attack, the IoT device (305) may become aware during a DoS attack that the resources on the IoT device (305) are being consumed above threshold levels. For example, processor utilization, memory and bandwidth consumption, and battery drain may be indicative of a DoS attack in progress.

The edge device (303) of FIG. 3, in accordance with embodiments of the present invention, is configured to provide a discoverable service for application-specific traffic filtering to IoT devices, such as the IoT device (305), in an IoT network (e.g., LAN (101)). Upon being discovered by the IoT device (305), the edge device (305) may authenticate itself to the IoT device (305) by providing credentials that indicate the edge device is an authorized device within the IoT network. The edge device (303) then receives a virtualized copy of the IoT device (331), which may be a lightweight version of the software stack of the IoT device (305), from the IoT device (303). Alternatively, the edge device (303) may receive the virtualized copy of the IoT device (331) when the IoT device (305) detects a DoS attack, or when resource consumption (e.g., processor, memory, bandwidth, or batter resources) on the IoT device (305) reach threshold levels. A cryptographically secure control channel (e.g., a keep alive channel) is established between the edge device (303) and the IoT device (305). The installed virtualized copy of the IoT device (331) is dormant under normal of the IoT device (305). However, when the IoT device (305) signals over the secure channel that the IoT device (305) is experiencing a DoS attack, the virtualized copy of the IoT device (331) is activated such that packet filtering and other security policies are implemented by the virtualized copy of the IoT device (331) using the resources (e.g., processor, memory, power) of the edge device (303). For example, the IoT device (305) may report to the edge device (303) that the IoT device (305) is exceeding one or more thresholds relating to processor utilization, memory utilization, bandwidth utilization, and/or battery drain. Due to the publish-subscribe nature of incoming traffic for the IoT device (305), it may be surmised that malicious traffic has been injected into one or more subscription topics. Accordingly, the virtualized copy of the IoT device (331) is activated, for example, by subscribing to the same subscriptions to which the IoT device (305) subscribes, such that the IoT device (305) may unsubscribe from these topics. Once subscribed, the virtualized copy of the IoT device (331) applies security policies to message traffic from these topics. For example, the virtualized copy of the IoT device (331) identifies an application-specific threat in the incoming traffic for a topic and implements an application-specific security policy that mitigates the identified threat. For example, the virtual copy (331) may apply an authorization for publishers to a topic, apply application-specific security policies that prevent or mitigate the exploitation of vulnerabilities in the application protocols of the IoT device, and filter packets that are determined to be illegitimate subscription content. After determining which packets of the incoming traffic are likely to be legitimate traffic, the virtualized copy of the IoT device (331) sends the sanitized traffic to the IoT device (305). After it is determined by the virtual copy of the IoT device (331) that the DoS attack is over, the subscriptions may be migrated back to the IoT device (305) and the virtual copy of the IoT device (331) may be deactivated.

The IoT device (305) of FIG. 3, in accordance with embodiments of the present invention, is configured to discover an application-specific filtering service provided by the edge device (303). The IoT device (305) authenticates the edge device (303) an authorized device within the IoT network based on credentials of the edge device (303). The IoT device then installs virtualized copy (331) of itself on the edge device (303), either as part of the discovery process or when the IoT device (305) detects a DoS attack, or when resource consumption (e.g., processor, memory, bandwidth, or batter resources) on the IoT device (305) reach threshold levels. Further, the IoT device (305) establishes a secure channel with the virtualized copy (331) of itself on the edge device (303). Under normal operation, the IoT device (305) receives content in a publish-subscribe network for at least one topic. However, when a DoS attack is detected, the IoT (305) transmits a message over the control channel to the edge device (303) activating the virtual copy (331). For example, the IoT device (305) may determine that resource consumption (e.g., processor utilization, memory utilization, bandwidth utilization, and/or battery drain) on the IoT device (305) has reached a threshold level, thus indicating a DoS attack is in progress from traffic received through the publish-subscribe network. After reporting the DoS attack to the edge device (303), the IoT device (305) sends a message to the publish-subscribe broker (309) to unsubscribe from the topic causing the excessive resource consumption or all topics to which the IoT device (305) is subscribed. The IoT device begins receiving sanitized subscription content from the unsubscribed topics by way of the virtual copy (331). The sanitized traffic includes packets to which security policies have been applied by the virtual copy (331). For example, the virtual copy (331) may apply an authorization for publishers to a topic, apply application-specific security policies that prevent or mitigate the exploitation of vulnerabilities in the application protocols of the IoT device, and filter packets that are determined to be illegitimate subscription content. The IoT device (305) may then utilize the sanitized packet traffic in the course of normal operation.

Due to resource constraints of the IoT device (305), the IoT device may not be able to expend the computational resources and resulting battery consumption needed to implement the security policies and packet filtering to respond to various types of DoS attacks. However, a conventional firewall or "one size fits all" security policy in the network gateway is unable to account for the heterogeneity of the IoT network; that is, different IoT manufactures, different IoT device function, different IoT device application protocols, etc. In one particular example in which a malicious publisher performs a packet flood DoS attack, the malicious publisher may publish packets at a high rate and with a high Quality of Service (QoS) value, causing the IoT device processor and communication stack to become overwhelmed and unable to determine whether packets should be dropped to prevent the excessive consumption of resources. Meanwhile, a conventional firewall that is unaware of application-specific protocols of the IoT device (305) may not recognize the traffic as outside normal operating parameters for the application protocol. In another particular example, a malicious publisher may transmit packets at a very slow rate to exploit a vulnerability of the IoT device (305) application protocol where the IoT device processor and communication stack stalls while waiting for additional packets. Thus, the IoT device (305) is unable to provide services during the period in which packet processing is stalled. Meanwhile, a conventional firewall that is unaware of application-specific protocols of the IoT device (305) may not recognize the traffic as outside normal operating parameters for the application protocol.

Figure 4:
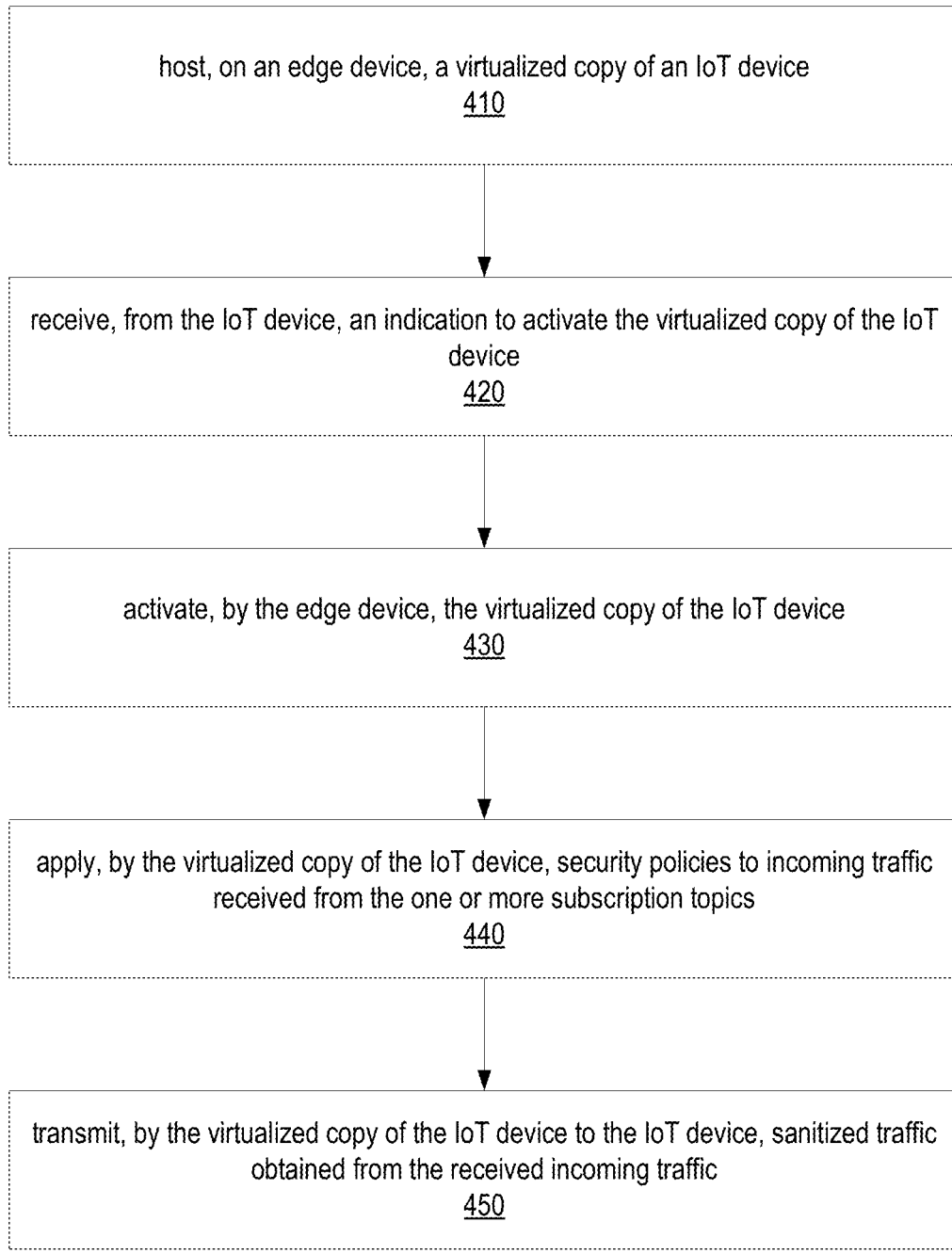
FIG. 4 is a flowchart illustrating an exemplary method of edge device assisted mitigation of publish-subscribe DoS attacks in accordance with the present invention.

For further explanation, FIG. 4 sets forth a flow chart illustrating an exemplary method for edge device assisted mitigation of publish-subscribe DoS attacks according to embodiments of the present invention that includes hosting (410), on an edge device, a virtualized copy of an IoT device. Hosting (410), on an edge device, a virtualized copy of an IoT device may be carried out by the edge device (303) providing, as a service, an IoT device application-specific filtering platform (330) to an IoT device (305) in an IoT device network such as LAN (101), and storing a virtualized copy (331) of the IoT device (305) by storing a copy of the software stack of the IoT devices (305). The edge device (303) also stores application-specific security policies (333) that can be applied in filtering packet traffic by the virtualized copy (331) of the IoT device (305). The application-specific security policies (333) may be specific to the IoT device (305) in relation to the device type, device manufacturer, application software, application software version, communication protocols, and other attributes of the IoT device (305) that will occur to those of skill in the art. It will be further appreciated that the edge device and IoT device application-specific filtering platform (330) may host one or more additional IoT devices (307) in the IoT network with virtualized copies and application-specific security policies (not shown) that are specific to those IoT devices (307). Under normal operation, the edge device (303) forwards publish-subscribe messages for subscribed topics to the IoT device (305) over a publish-subscribe channel.

The exemplary method of FIG. 4 also includes receiving (420), from the IoT device, an indication to activate the virtualized copy of the IoT device. Receiving (420), from the IoT device, an indication to activate the virtualized copy of the IoT device may be carried out by the edge device (303) receiving an indication over a control channel that the virtualized copy (331) of the IoT device (305) should be activated. For example, the edge device (303) may receive a report that the IoT device (305) is experiencing a DoS attack. Alternatively, receiving (420), from the IoT device, an indication to activate the virtualized copy of the IoT device may include periodically polling the IoT device and determining lack of response from the IoT device (305) to be an indication that the IoT device is experiencing a DoS attack.

The exemplary method of FIG. 4 also includes activating (430), by the edge device, the virtualized copy of the IoT device. Activating (430), by the edge device, the virtualized copy of the IoT device may be carried out by the virtualized copy (331) of the IoT device (305) intercepting communication intended for the IoT device (305). For example, the virtualized copy (331) of the IoT device (305) may subscribe to one or more topics an begin processing messages published to those topics in accordance with the application and communication protocols of the IoT device. A copy of the communication stack of the IoT device (305) may be provided in the virtualized copy (331) of the IoT device (305) in order to process incoming packets for those messages published to the topics subscribed to by the IoT device.

The exemplary method of FIG. 4 also includes applying (440), by the virtualized copy of the IoT device, security policies to incoming traffic received from the one or more subscription topics. Applying (440), by the virtualized copy of the IoT device, security policies to incoming traffic received from the one or more subscription topics may be carried out by the virtualized copy (331) of the IoT device (305) applying the application-specific security policies (333) that are specific to the IoT device (305). For example, the virtual copy (331) of the IoT device (305) determine whether a publisher to a topic is an authorized publish, analyze packet traffic for messages published to the topic in relation to application protocols and communication protocols of the IoT device, determine a likelihood that the incoming packet traffic is intended to disrupt the performance of the IoT device (305) or the service provided by the IoT device by, for example, exploiting vulnerabilities in the application protocols or communication protocols of the IoT device (305), and filter packets (e.g., drop packets) that are determined to cause a disruption in the performance of the IoT device, to be part of a DoS attack, or are otherwise illegitimate subscription content from an unauthorized or malicious publisher.

The exemplary method of FIG. 4 also includes transmitting (450), by the virtualized copy of the IoT device to the IoT device, sanitized traffic obtained from the received incoming traffic. Transmitting (450), by the virtualized copy of the IoT device to the IoT device, sanitized traffic obtained from the received incoming traffic may be carried out by the virtual copy (331) of the IoT device (305) forwarding filtered packets of subscription content to the IoT device (305). For example, the virtual copy (331) of the IoT device (305) sends packet traffic that is in conformance with the application-specific security policies (333) to the IoT device (305). The packet traffic that is determined to be in conformance with the application-specific security policies comprises packet traffic that was not dropped because it was determined to cause a disruption in the performance of the IoT device, to be part of a DoS attack, or are otherwise illegitimate subscription content from an unauthorized or malicious publisher. In one embodiment, the sanitized traffic is sent over a communication channel other than the initial publish-subscribe channel or the control channel. In another embodiment, the sanitized traffic is sent using the initial publish-subscribe channel through a publish-subscribe topic mangling technique, in which the IoT device (305) unsubscribes from the original topic and subscribes to a different topic that is known only by the virtual copy (331). Thus, the IoT device (305) and the virtual copy (331) use the publish-subscribe channel as a secure unicast communication channel. In this embodiment, the IoT device (305) does not have to establish another data plane communication channel, as it can reuse the existing publish-subscribe channel.

Figure 5:
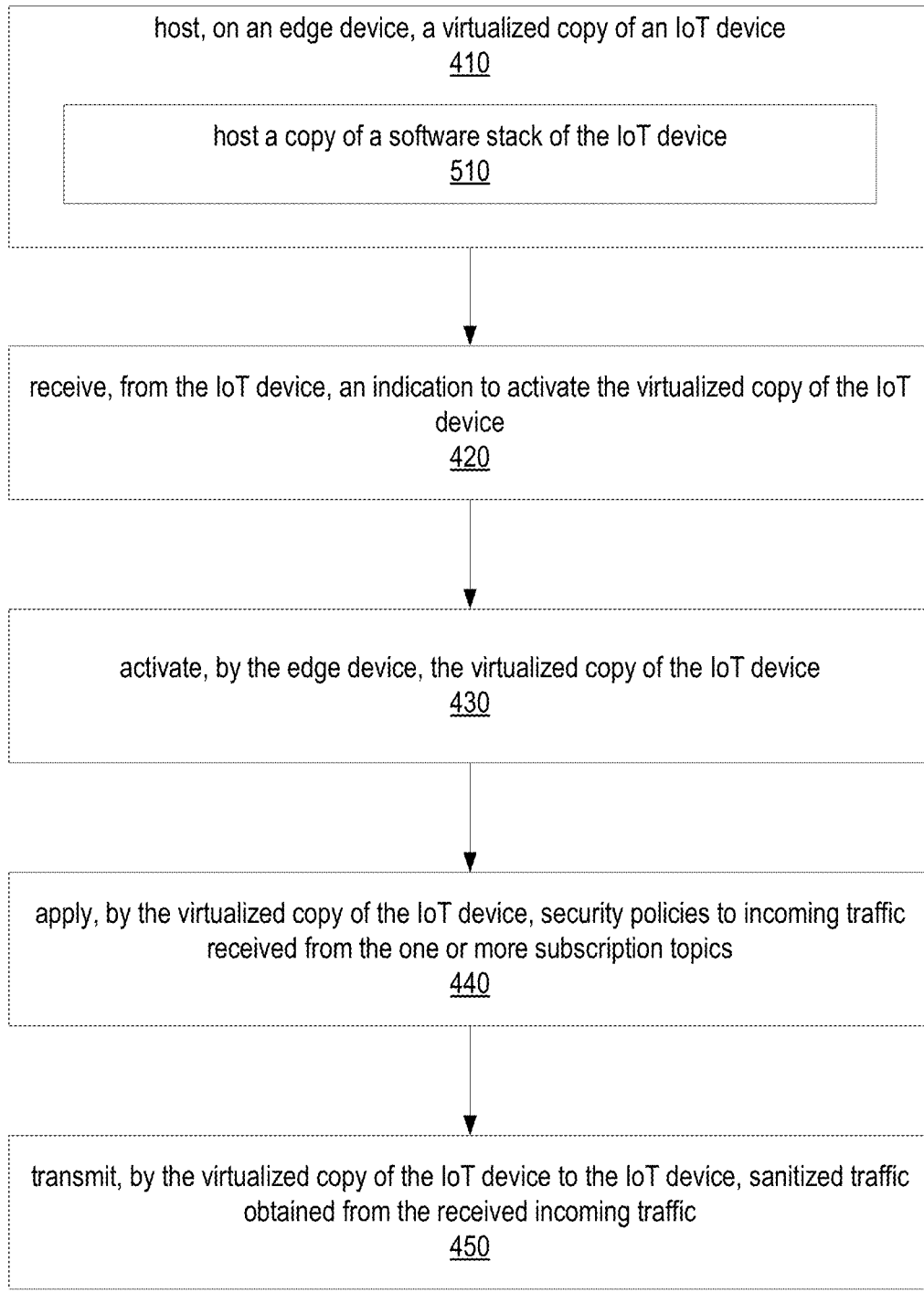
FIG. 5 is a flowchart illustrating another exemplary method of edge device assisted mitigation of publish-subscribe DoS attacks in accordance with the present invention.

For further explanation, FIG. 5 sets forth a flow chart illustrating a further exemplary method for edge device assisted mitigation of publish-subscribe DoS attacks according to embodiments of the present invention. Like the method of FIG. 4, the method of FIG. 5 also includes hosting (410), on an edge device, a virtualized copy of an IoT device, receiving (420), from the IoT device, an indication to activate the virtualized copy of the IoT device, activating (430), by the edge device, the virtualized copy of the IoT device, applying (440), by the virtualized copy of the IoT device, security policies to incoming traffic received from the one or more subscription topics, and transmitting (450), by the virtualized copy of the IoT device to the IoT device, sanitized traffic obtained from the received incoming traffic.

The method of FIG. 5 is different from the method of FIG. 4 in that includes hosting (410), on an edge device, a virtualized copy of an IoT device further includes hosting (510) a copy of a software stack of the IoT device. Hosting (510) a copy of a software stack of the IoT device may be carried out by the edge device (303) storing, as part of the virtual copy (331) of the IoT device (305), a copy of the application protocols and communication protocols of the IoT device (305). For example, the communication protocols may include the communication protocol stack and interface methods that determine how incoming packets are processed. The application protocols may define application layer protocols for message handling, including but not limited to a publish-subscribe paradigm such as Real Time Publish Subscribe (RTPS).

Figure 6:
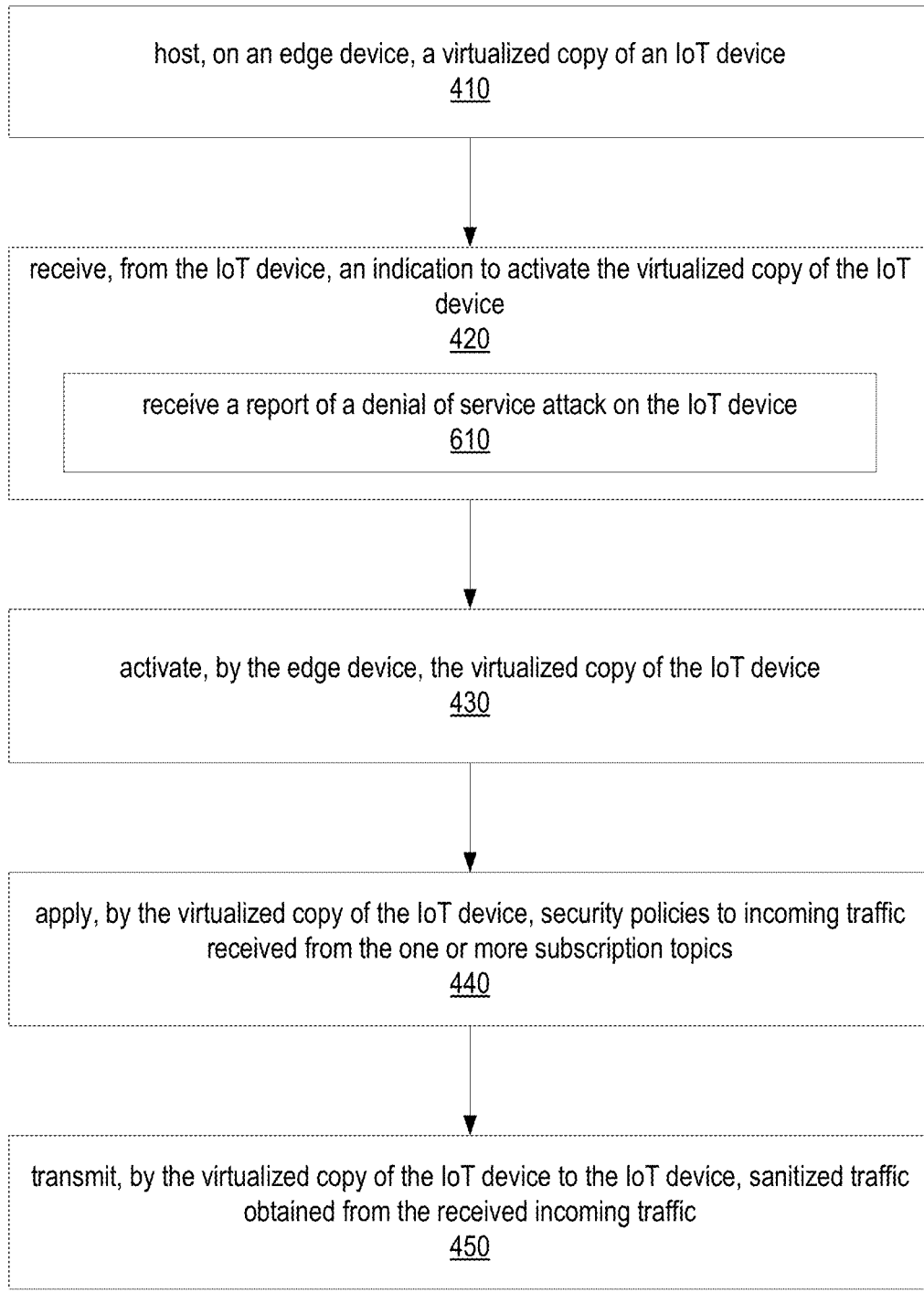
FIG. 6 is a flowchart illustrating another exemplary method of edge device assisted mitigation of publish-subscribe DoS attacks in accordance with the present invention.

For further explanation, FIG. 6 sets forth a flow chart illustrating a further exemplary method for edge device assisted mitigation of publish-subscribe DoS attacks according to embodiments of the present invention. Like the method of FIG. 4, the method of FIG. 6 also includes hosting (410), on an edge device, a virtualized copy of an IoT device, receiving (420), from the IoT device, an indication to activate the virtualized copy of the IoT device, activating (430), by the edge device, the virtualized copy of the IoT device, applying (440), by the virtualized copy of the IoT device, security policies to incoming traffic received from the one or more subscription topics, and transmitting (450), by the virtualized copy of the IoT device to the IoT device, sanitized traffic obtained from the received incoming traffic.

The method of FIG. 6 is different from the method of FIG. 4 in that receiving (420), from the IoT device, an indication to activate the virtualized copy of the IoT device further includes receiving (610) a report of a denial of service attack on the IoT device. Receiving (610) a report of a denial of service attack on the IoT device may be carried out by the edge device (303) and virtual copy (331) of the IoT device (305) receiving a message over the control channel indicating that the IoT device (305) has determined a DoS attack to be in progress. Receiving (610) a report of a denial of service attack on the IoT device may also be carried out by the edge device (303) and virtual copy (331) of the IoT device (305) receiving an indication over the control channel that processor utilization, memory utilization, bandwidth utilization, and/or battery drain on the IoT device (305) is exceeding one or more thresholds.

Figure 7:
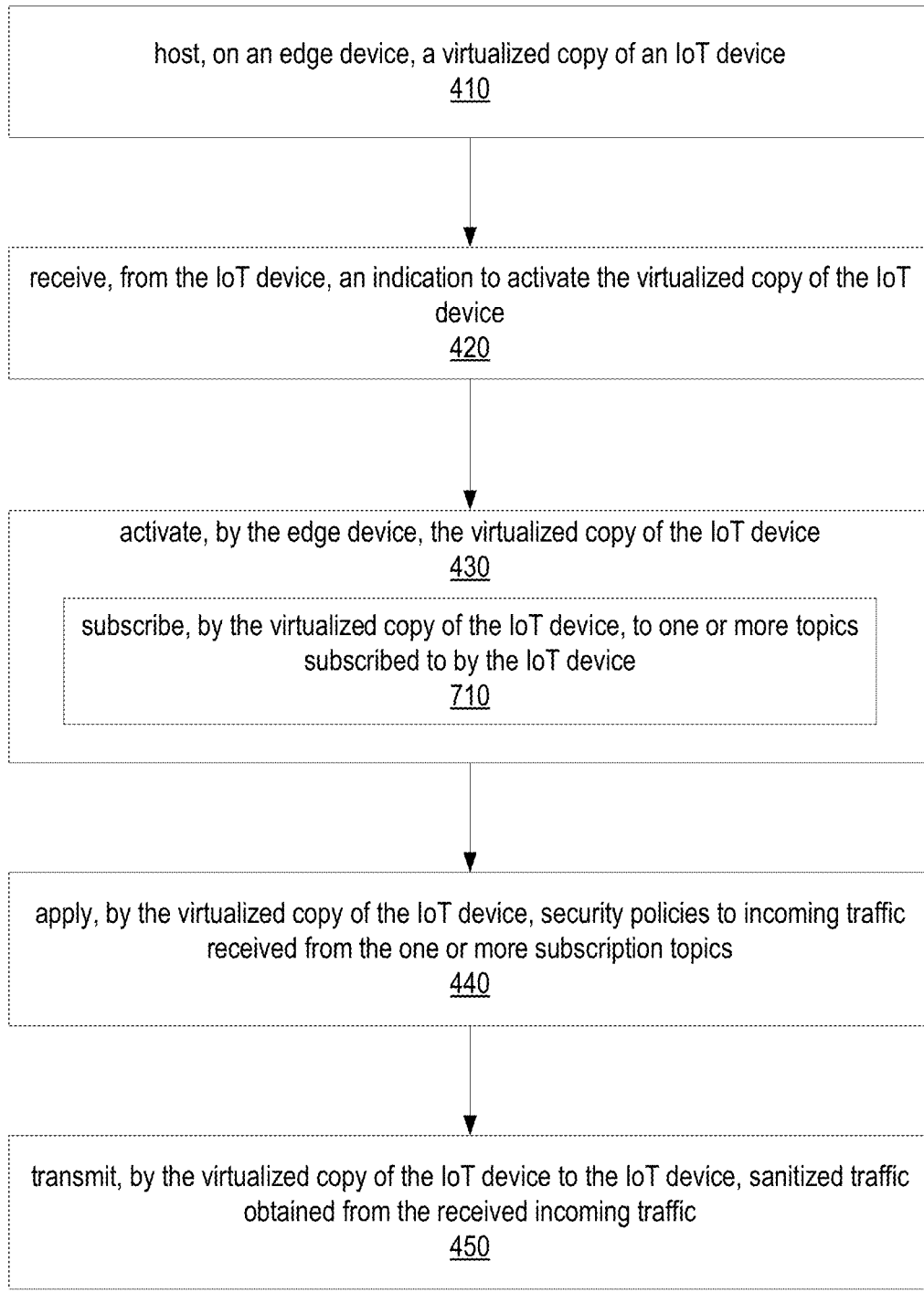
FIG. 7 is a flowchart illustrating another exemplary method of edge device assisted mitigation of publish-subscribe DoS attacks in accordance with the present invention.

For further explanation, FIG. 7 sets forth a flow chart illustrating a further exemplary method for edge device assisted mitigation of publish-subscribe DoS attacks according to embodiments of the present invention. Like the method of FIG. 4, the method of FIG. 7 also includes hosting (410), on an edge device, a virtualized copy of an IoT device, receiving (420), from the IoT device, an indication to activate the virtualized copy of the IoT device, activating (430), by the edge device, the virtualized copy of the IoT device, applying (440), by the virtualized copy of the IoT device, security policies to incoming traffic received from the one or more subscription topics, and transmitting (450), by the virtualized copy of the IoT device to the IoT device, sanitized traffic obtained from the received incoming traffic.

The method of FIG. 7 is different from the method of FIG. 4 in that activating (430), by the edge device, the virtualized copy of the IoT device further includes subscribing (710), by the virtualized copy of the IoT device, to one or more topics subscribed to by the IoT device may be carried out by the virtual copy (331) of the IoT device (305) subscribing to one or more topics subscribed to by the IoT device (305). For example, the virtual copy (331) of the IoT device (305) may send a subscribe request to publish-subscribe broker (309) for each topic subscribed to by the IoT device (305). A list of topics may be provided in the virtual copy (331) of the IoT device (305) at initialization/installation of the virtual copy (331) on the edge device (303).

Figure 8:
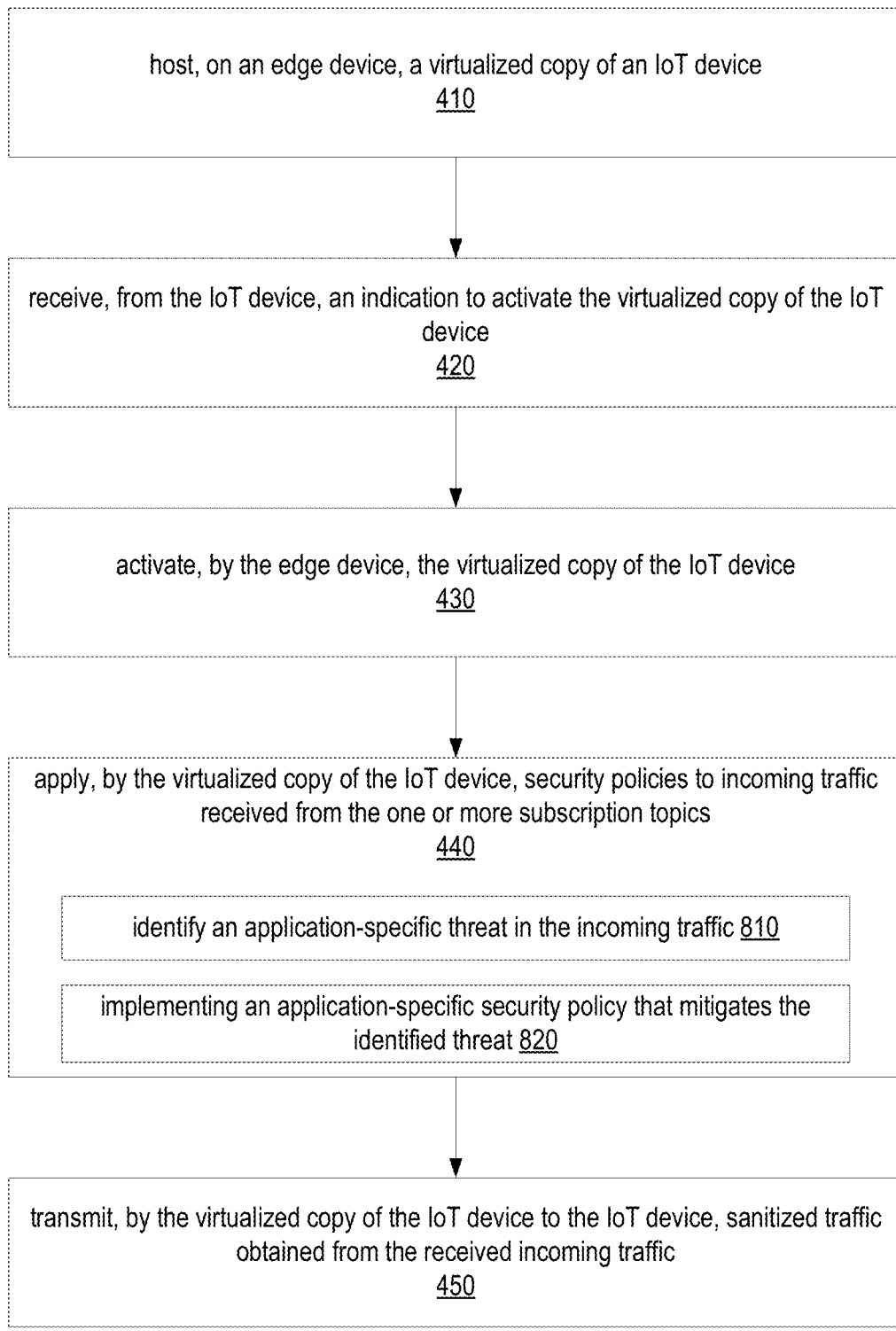
FIG. 8 is a flowchart illustrating another exemplary method of edge device assisted mitigation of publish-subscribe DoS attacks in accordance with the present invention.

For further explanation, FIG. 8 sets forth a flow chart illustrating a further exemplary method for edge device assisted mitigation of publish-subscribe DoS attacks according to embodiments of the present invention. Like the method of FIG. 4, the method of FIG. 8 also includes hosting (410), on an edge device, a virtualized copy of an IoT device, receiving (420), from the IoT device, an indication to activate the virtualized copy of the IoT device, activating (430), by the edge device, the virtualized copy of the IoT device, applying (440), by the virtualized copy of the IoT device, security policies to incoming traffic received from the one or more subscription topics, and transmitting (450), by the virtualized copy of the IoT device to the IoT device, sanitized traffic obtained from the received incoming traffic.

The method of FIG. 8 is different from the method of FIG. 4 in that transmitting (450), by the virtualized copy of the IoT device to the IoT device, sanitized traffic obtained from the received incoming traffic further includes identifying (810) an application-specific threat in the incoming traffic. Identifying (810) the application-specific threat in the incoming traffic may be carried out by the virtual copy (331) of the IoT device (305) analyzing packet traffic from the subscribed topics. For example, the virtual copy (331) of the IoT device (305) may analyze the number of packets in a packet queue (not shown) and the rate at which the packets are received, inspect packet header information such as source IP address, QoS values, and flow labels, analyze packet payload. Based on the analysis and inspection of the incoming packet traffic, the virtual copy (331) of the IoT device (305) compares the incoming packet traffic to application protocols and communication protocols of the IoT device (305) to determine whether the incoming packet traffic conforms with expected or normal (i.e., historical) packet flows under these protocols and through statistical methods. When incoming packet traffic does not conform to expected or normal packet flows, the nonconforming packet flows may be identified as posing an application-specific threat that could disrupt performance of an IoT service or device operation.

The method of FIG. 8 is also different from the method of FIG. 4 in that transmitting (450), by the virtualized copy of the IoT device to the IoT device, sanitized traffic obtained from the received incoming traffic also further includes implementing (820) an application-specific security policy that mitigates the identified threat. Implementing (820) an application-specific security policy that mitigates the identified threat may be carried out by the virtual copy (331) of the IoT device (305) applying application-specific security polices (333) to incoming packet traffic relating to messages published to topics subscribed to by the virtual copy (331) of the IoT device (305). For example, the virtual copy (331) of the IoT device (305) may filter out packets from a source IP address that are transmitted beyond a threshold rate, reject packets associated with an identified malicious publisher, reject packets from not originating from an authorized publisher, filter out packets that do not conform with application protocol requirements and constraints, reject packet streams that do not meet key completion indicators, and/or reject packet streams that do not statistically conform with normal application and communication protocol norms. The packet flows that are not rejected or filtered are considered to be sanitized and may be forwarded to the IoT device (305) for normal processing.

Figure 9:
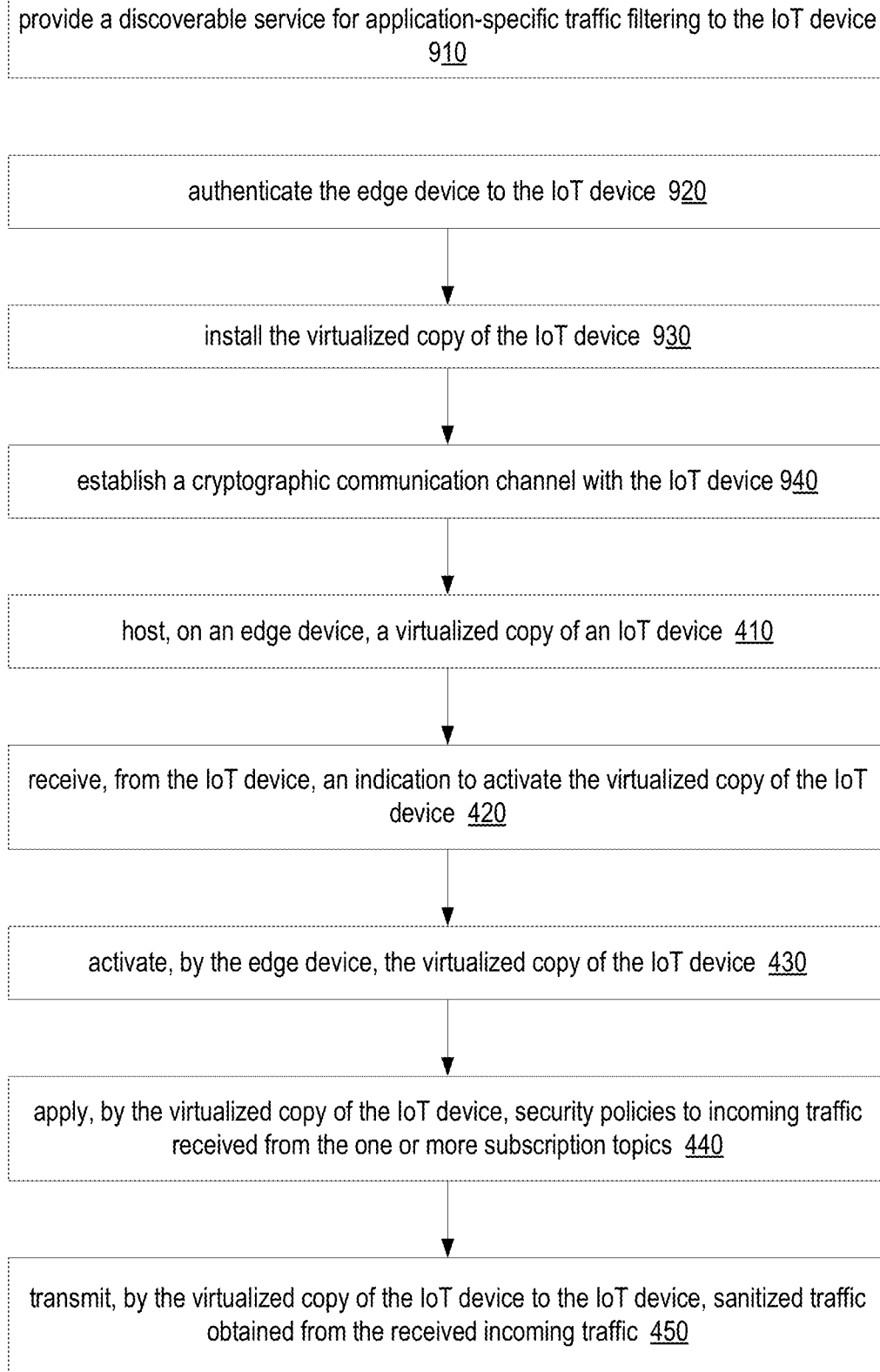
FIG. 9 is a flowchart illustrating another exemplary method of edge device assisted mitigation of publish-subscribe DoS attacks in accordance with the present invention.

For further explanation, FIG. 9 sets forth a flow chart illustrating a further exemplary method for edge device assisted mitigation of publish-subscribe DoS attacks according to embodiments of the present invention. Like the method of FIG. 4, the method of FIG. 9 also includes hosting (410), on an edge device, a virtualized copy of an IoT device, receiving (420), from the IoT device, an indication to activate the virtualized copy of the IoT device, activating (430), by the edge device, the virtualized copy of the IoT device, applying (440), by the virtualized copy of the IoT device, security policies to incoming traffic received from the one or more subscription topics, and transmitting (450), by the virtualized copy of the IoT device to the IoT device, sanitized traffic obtained from the received incoming traffic.

The method of FIG. 9 is different from the method of FIG. 4 in that the method of FIG. 4 further includes providing (910) a discoverable service for application-specific traffic filtering to the IoT device. Providing (910) a discoverable service for application-specific traffic filtering to the IoT device may be carried out by the edge device (303) providing an IoT device application-specific filtering platform (330) to the IoT device (305) upon which the virtual copy (331) of the IoT device (305) and associated application-specific security policies (333) may be installed. The an IoT device application-specific filtering platform (330) may be provided in the "anything as a service" (XaaS) model such that the an IoT device application-specific filtering platform (330) is discoverable on the edge device (303) when the IoT device (305) joins the LAN (101) or when the edge device (303) joins the LAN (101). The an IoT device application-specific filtering platform (330) provides protocols, interfaces, and storage for hosting the virtual copy (331) of the IoT device (305).

The method of FIG. 9 also includes authenticating (920) the edge device to the IoT device. Authenticating (920) the edge device to the IoT device may be carried out by the edge device (303) providing credentials for authentication by the IoT device (305). For example, the IoT device (305) may authenticate the edge device (303) with an authentication authority such as administrative server (not shown) on the LAN (101).

The method of FIG. 9 also includes installing (930) the virtualized copy of the IoT device. Installing (930) the virtualized copy of the IoT device a copy of the software stack of the IoT devices (305) may be carried out by the edge device (303) installing the virtual copy (331) of the IoT device (305) including the software stack of the IoT device and application-specific security policies. For example, the edge device (303) may store a copy of the application protocols and communication stack in memory and configure the virtual copy (331) of the IoT device (305) with a communication interface such that, when activate, the virtual copy (331) of the IoT device (305) may function as if it were the actual IoT device (305) with regard to communication handling.

The method of FIG. 9 also includes establishing (940) a cryptographic communication channel with the IoT device. Establishing (940) a cryptographic communication channel with the IoT device may be carried out by the IoT device (305) and edge device (303) establishing a control channel using a cryptographic mechanism. For example, the IoT device (305) and edge device (303) may communicate over a channel using transport layer security (TLS) or datagram TLS (DTLS). The control channel may be bidirectional in that the IoT device (305) may report a DoS attack through the control channel and the edge device (303) may periodically poll the IoT device (305) to determine whether the IoT device (305) is functioning. In the event of a timeout during the polling, the edge device (303) may determine that the IoT device (305) is experiencing a DoS attack and activate the virtual copy (331) of the IoT device (305).

Figure 10:
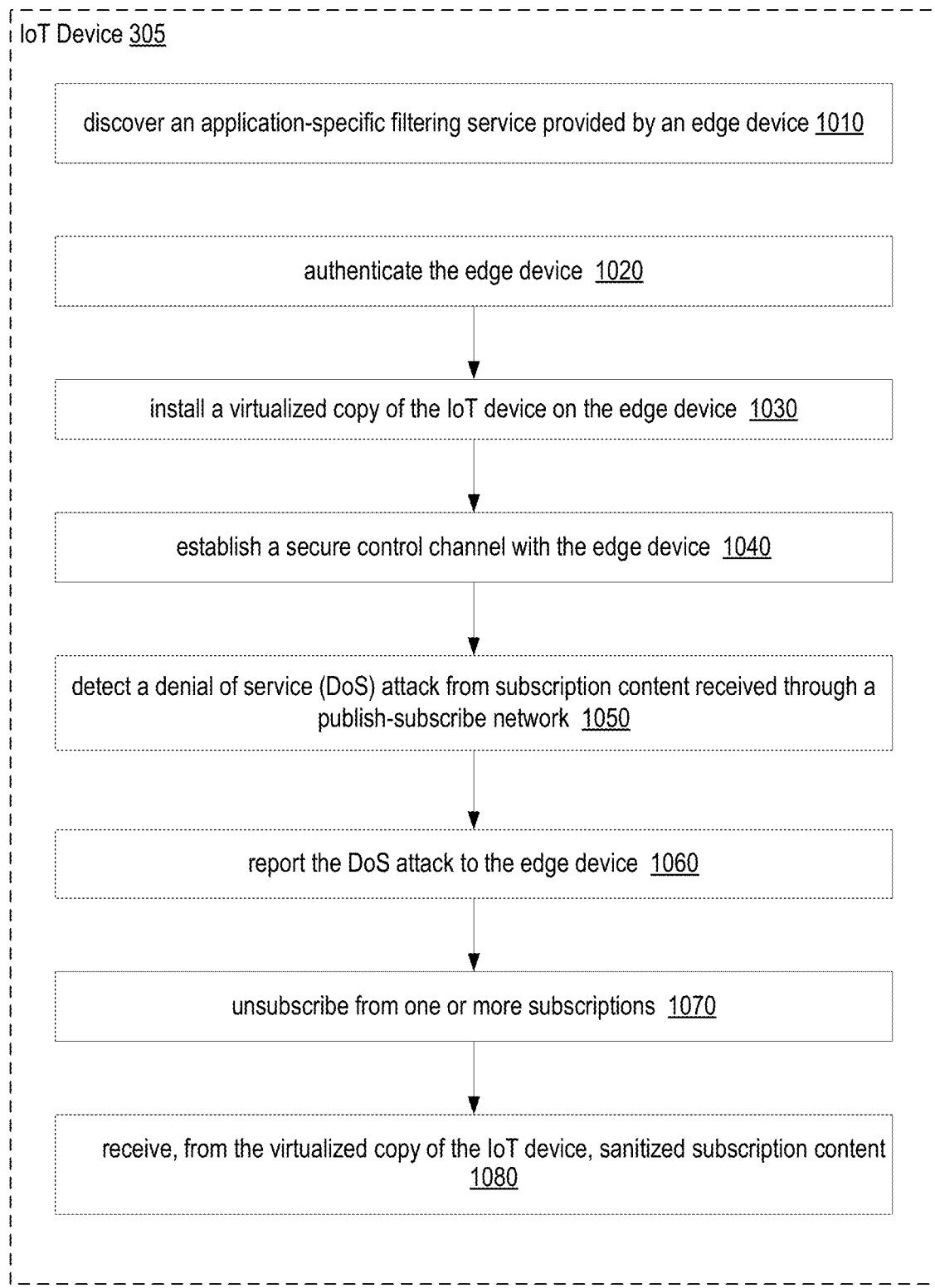
FIG. 10 is a flowchart illustrating another exemplary method of edge device assisted mitigation of publish-subscribe DoS attacks in accordance with the present invention.

For further explanation, FIG. 10 sets forth a flow chart illustrating a further exemplary method for edge device assisted mitigation of publish-subscribe DoS attacks according to embodiments of the present invention that includes discovering (1010), by an IoT device, an application-specific filtering service provided by an edge device. Discovering (1010), by an IoT device, an application-specific filtering service provided by an edge device may be carried out by the IoT device discovering an IoT device application-specific filtering platform (330) on the edge device (303) upon which the virtual copy (331) of the IoT device (305) and associated application-specific security policies (333) may be installed. The an IoT device application-specific filtering platform (330) may be provided in the "anything as a service" (XaaS) model such that the an IoT device application-specific filtering platform (330) is discoverable on the edge device (303) when the IoT device (305) joins the LAN (101) or when the edge device (303) joins the LAN (101). The an IoT device application-specific filtering platform (330) provides protocols, interfaces, and storage for hosting the virtual copy (331) of the IoT device (305).

The method of FIG. 10 also includes authenticating (1020), by the IoT device, the edge device. Authenticating (1020), by the IoT device, the edge device may be carried out by the IoT device authenticating the edge device (303) to determine that the edge device (303) is an authorized entity in the network. For example, the IoT device (305) may authenticate the edge device (303) with an authentication authority such as administrative server (not shown) in the LAN (101).

The method of FIG. 10 also includes installing (1030) a virtualized copy of the IoT device on the edge device. Installing (1030) a virtualized copy of the IoT device on the edge device may be carried out by the IoT device generating a lightweight virtualized copy (331) of the software stack of the IoT device (305) and uploading the virtual copy (331) to the edge device (303). For example, the lightweight virtual copy (331) of the IoT device may include the application and communication protocols used for message handling with respect to published messages in a publish-subscribe network. Under normal operation, the IoT device receives publish-subscribe messages for subscribed topics from the edge device over a publish-subscribe channel.

The method of FIG. 10 also includes establishing (1040) a secure control channel with the edge device. Establishing (1040) a secure control channel with the edge device may be carried out by the IoT device (305) and edge device (303) establishing a control channel using a cryptographic mechanism. For example, the IoT device (305) and edge device (303) may communication over a channel using transport layer security (TLS) or datagram TLS (DTLS).

The method of FIG. 10 also includes detecting (1050), by the IoT device, a denial of service (DoS) attack from subscription content received through a publish-subscribe network. For example, the IoT device (305) may become aware that the resources on the IoT device (305) are being consumed above threshold levels due to the processing of messages received in relation to one or more topics to which the IoT device is subscribed. For example, processor utilization, memory and bandwidth consumption, and battery drain may be indicative of a DoS attack in progress when those levels exceed normal operating parameters based on historical operation or application protocol constraints.

The method of FIG. 10 also includes reporting (1060), by the IoT device, the DoS attack to the edge device. Reporting (1060), by the IoT device, the DoS attack to the edge device may be carried out by the IoT device (305) reporting to the edge device (303) through the control channel that a DoS attack is in progress or the IoT device (305) reporting to the edge device (303) through the control channel that the IoT device (305) is exceeding one or more thresholds relating to processor utilization, memory utilization, bandwidth utilization, and/or battery drain.

The method of FIG. 10 also includes unsubscribing (1070), by the IoT device, from one or more subscriptions. Unsubscribing (1070), by the IoT device, from one or more subscriptions may be carried out by sending an unsubscribe message for one or more topics to the publish-subscribe broker.

The method of FIG. 10 also includes receiving (1080), by the IoT device, from the virtualized copy of the IoT device, sanitized subscription content. Receiving (1080), by the IoT device, from the virtualized copy of the IoT device, sanitized subscription content may be carried out by the IoT device (305) receiving filtered packet traffic from the virtual copy (331) of the IoT device (305). The filtered packet traffic is incoming packet traffic for a topic that has been subjected to the security policies (333) by the virtual copy (331) of the IoT device (305) such that legitimate packet traffic is forwarded to the IoT device (305). In one embodiment, the sanitized traffic is received over a communication channel other than the initial publish-subscribe channel or the control channel. In another embodiment, the sanitized traffic is received using the initial publish-subscribe channel through a publish-subscribe topic mangling technique, in which the IoT device (305) unsubscribes from the original topic and subscribes to a different topic that is known only by the virtual copy (331). Thus, the IoT device (305) and the virtual copy (331) use the publish-subscribe channel as a secure unicast communication channel. In this embodiment, the IoT device (305) does not have to establish another data plane communication channel, as it can reuse the existing publish-subscribe channel.

In view of the explanations set forth above, readers will recognize that the benefits of edge device assisted mitigation of publish-subscribe DoS attacks according to embodiments of the present invention include improvements to edge device and IoT device functionality in which:
- application-specific security policy implementation is offloaded from a resource-constrained IoT device to an edge device to leverage the greater resources of the edge device during a DoS attack;
- the virtual copy of the IoT device can be readily updated with DoS attach signatures, security policies, and protection mechanisms;
- a non-centralized mechanism security mechanism triggered by the IoT device avoids the application of a "one size fits all" security policy by a network gateway that is unaware of application requirements and constraints of the IoT device, IoT device performance, and IoT device attributes and characteristics;
- a virtualized shadow copy of the IoT device on the edge device absorbs the impact of the DoS attach while providing sanitized traffic to the IoT device so that the IoT device operation is not disrupted by the DoS attack;
- legacy publish-subscribe systems are supported in that the publish-subscribe infrastructure requires no modification;
- application-specific DoS attacks are handled without blocking traffic from the publish-subscribe broker and thus preventing legitimate traffic from passing to the IoT device or other IoT nodes.

Exemplary embodiments of the present invention are described largely in the context of a fully functional computer system for edge device assisted mitigation of publish-subscribe DoS attacks. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
hosting, on an edge device, a virtualized copy of an Internet-of-Things (IoT) device configured to assist in mitigating publish-subscribe denial of service (DoS) attacks;
receiving, by the edge device and from the IoT device, an indication to activate the virtualized copy of the IoT device;
activating, by the edge device and based on the indication, the virtualized copy of the IoT device, including subscribing, by the virtualized copy of the IoT device, to one or more topics subscribed to by the IoT device and unsubscribing the IoT device from the one or more topics;
applying, by the virtualized copy of the IoT device, security policies to incoming traffic received from one or more subscription topics; and
transmitting, by the virtualized copy of the IoT device to the IoT device, sanitized traffic obtained from the received incoming traffic.

2. The method of claim 1, wherein hosting, on the edge device, the virtualized copy of an IoT device includes hosting a copy of a software stack of the IoT device.

3. The method of claim 1, wherein receiving, from the IoT device, the indication to activate the virtualized copy of the IoT device includes receiving a report of a DoS attack on the IoT device.

4. The method of claim 1, wherein applying, by the virtualized copy of the IoT device, security policies to incoming traffic received from the one or more subscription topics includes:
identifying an application-specific threat in the incoming traffic; and
implementing an application-specific security policy that mitigates the identified threat.

5. The method of claim 1, further comprising:
providing a discoverable service for application-specific traffic filtering to the IoT device;
authenticating the edge device to the IoT device;
installing the virtualized copy of the IoT device; and
establishing a cryptographic communication channel with the IoT device.

6. The method of claim 1, wherein the edge device is at least one of an edge server, a router, and a routing switch, and wherein the IoT device is an end-point device.

7. An apparatus comprising a computer processor,
a computer memory operatively coupled to the computer processor, the computer memory having disposed within it computer program instructions that, when executed by the computer processor, cause the apparatus to:
host, on an edge device, a virtualized copy of an Internet-of Things (IoT) device configured to assist in mitigating publish-subscribe denial of service (DoS) attacks;
receive, by the edge device and from the IoT device, an indication to activate the virtualized copy of the IoT device;
activate, by the edge device and based on the indication, the virtualized copy of the IoT device, including subscribing, by the virtualized copy of the IoT device, to one or more topics subscribed to by the IoT device and unsubscribing the IoT device from the one or more topics;
apply, by the virtualized copy of the IoT device, security policies to incoming traffic received from one or more subscription topics; and
transmit, by the virtualized copy of the IoT device to the IoT device, sanitized traffic obtained from the received incoming traffic.

8. The apparatus of claim 7, wherein hosting, on the edge device, the virtualized copy of an IoT device includes hosting a copy of a software stack of the IoT device.

9. The apparatus of claim 7, wherein receiving, from the IoT device, the indication to activate the virtualized copy of the IoT device includes receiving a report of a DoS attack on the IoT device.

10. The apparatus of claim 7, wherein applying, by the virtualized copy of the IoT device, security policies to incoming traffic received from the one or more subscription topics includes:
identify an application-specific threat in the incoming traffic; and
implement an application-specific security policy that mitigates the identified threat.

11. The apparatus of claim 7, the memory further comprising computer program instructions that, when executed by the computer processor, cause the apparatus to:
provide a discoverable service for application-specific traffic filtering to the IoT device;
authenticate the edge device to the IoT device;
install the virtualized copy of the IoT device; and
establish a cryptographic communication channel with the IoT device.

12. The apparatus of claim 7, wherein the edge device is at least one of an edge server, a router, and a routing switch, and wherein the IoT device is an end-point device.

13. A computer program product, the computer program product comprising a non-volatile computer readable medium and computer program instructions stored therein that are configured to, when executed by a processor, cause a computer to perform operations comprising:
host, on an edge device, a virtualized copy of an Internet-of Things (IoT) device configured to assist in mitigating publish-subscribe denial of service (DoS) attacks;
receive, by the edge device and from the IoT device, an indication to activate the virtualized copy of the IoT device;
activate, by the edge device and based on the indication, the virtualized copy of the IoT device, including subscribing, by the virtualized copy of the IoT device, to one or more topics subscribed to by the IoT device and unsubscribing the IoT device from the one or more topics;
apply, by the virtualized copy of the IoT device, security policies to incoming traffic received from one or more subscription topics; and
transmit, by the virtualized copy of the IoT device to the IoT device, sanitized traffic obtained from the received incoming traffic.

14. The computer program product of claim 13, wherein hosting, on the edge device, the virtualized copy of an IoT device includes hosting a copy of a software stack of the IoT device.

15. The computer program product of claim 13, wherein receiving, from the IoT device, the indication to activate the virtualized copy of the IoT device includes receiving a report of a DoS attack on the IoT device.

16. The computer program product of claim 13, wherein applying, by the virtualized copy of the IoT device, security policies to incoming traffic received from the one or more subscription topics includes:
identify an application-specific threat in the incoming traffic; and
implement an application-specific security policy that mitigates the identified threat.

17. The computer program product of claim 13 further comprising computer program instructions that, when executed, cause the computer to:
provide a discoverable service for application-specific traffic filtering to the IoT device;
authenticate the edge device to the IoT device;
install the virtualized copy of the IoT device; and
establish a cryptographic communication channel with the IoT device.

* * * * *